(12) United States Patent
Mättö

(10) Patent No.: US 6,954,638 B2
(45) Date of Patent: Oct. 11, 2005

(54) ELECTRONIC DEVICE AND METHOD OF OPERATION

(75) Inventor: Juhani Mättö, Tampere (FI)

(73) Assignee: Nokia Corporation, Espoo (FI)

( * ) Notice: Subject to any disclaimer, the term of this patent is extended or adjusted under 35 U.S.C. 154(b) by 345 days.

(21) Appl. No.: 09/985,979

(22) Filed: Nov. 7, 2001

(65) Prior Publication Data

US 2002/0065077 A1 May 30, 2002

(30) Foreign Application Priority Data

Nov. 10, 2000 (GB) .............................................. 0027526

(51) Int. Cl.⁷ ................................................. H04Q 7/20
(52) U.S. Cl. ................................ 455/426.1; 455/414.4; 455/418; 455/412.1; 709/207; 709/205
(58) Field of Search ......................... 455/432.2, 426.1, 455/432.1, 418, 419, 412.1, 515, 422.1, 456; 709/207, 205, 204

(56) References Cited

U.S. PATENT DOCUMENTS 6,311,058 B1 * 10/2001 Wecker et al. .............. 455/418
6,542,740 B1 * 4/2003 Olgaard et al. ............. 455/515
6,684,257 B1 * 1/2004 Camut et al. ............... 709/246
6,695,702 B2 * 2/2004 Morita ........................ 463/41

FOREIGN PATENT DOCUMENTS

| GB | 2 327 565 A | 1/1999 |
| GB | 2 356 319 A | 5/2001 |
| WO | 99/03595 | 1/1999 |

* cited by examiner

*Primary Examiner*—William Trost
*Assistant Examiner*—Danh Le
(74) *Attorney, Agent, or Firm*—Antonelli, Terry, Stout and Kraus, LLP.

(57) ABSTRACT

A method, apparatus and system are disclosed. The system includes a portable wireless communication device operable with a wireless communication network. The portable device receives information from the network. The portable device can transmit to the network a request for an address from which additional information is available. The network can supply the address to the portable device, which can then transmit the address to another device.

29 Claims, 4 Drawing Sheets

ELECTRONIC DEVICE AND METHOD OF OPERATION

BACKGROUND OF THE INVENTION

This invention relates to a portable communication device, such as a portable telephone or computer, equipped with a browser application for communicating with a remote computer over a wireless network. The browser application is operable according to a standard such as WAP (Wireless Application Protocol), which is optimised for portable devices having a limited display size.

SUMMARY OF THE INVENTION

According to a first aspect of the present invention, there is provided a method according to claim 1.

According to a second aspect of the present invention, there is provided a method according to claim 12.

According to a third aspect of the present invention, there is provided a portable wireless communication device according to claim 13.

According to a fourth aspect of the present invention, there is provided a portable wireless communication device according to claim 14.

According to a fifth aspect of the present invention, there is provided a method according to claim 19.

According to a sixth aspect of the present invention, there is provided a wireless communication network according to claim 21.

According to a seventh aspect of the present invention, there is provided a method of operating a system according to claim 22.

A portable wireless communication device equipped with a browser is able to access specially optimised pages of data on a remote computer. The optimisation usually involves providing pages suitable for viewing on a small display, and for downloading via a relatively slow data connection. Hence, such pages tend to be short, and relatively lacking in graphic images when compared to pages viewable via an Internet connection. One example of such a device is a mobile telephone equipped with a WAP browser.

Users of portable wireless devices often have experience of using desktop computers which are equipped to access the Internet. The type of information which is accessible on the Internet is markedly different to that available using portable wireless devices. Internet pages are encoded in a different format, and can offer content that extends beyond the relatively basic textual information available on wireless devices. Also, the data connection speeds available to desktop computers can be orders of magnitude greater than those available for portable devices, and this allows the received pages to be augmented with graphic images, sounds, movies, other multimedia files and embedded applications.

Once a user has used a desktop system with its faster connection speeds, increased display size, richer content and improved interactivity, the data received via a portable device can seem rather basic in comparison.

With currently available WAP-equipped telephones, it is possible to receive a page of information, store it in the telephone, and then print it out at a convenient time. However, due to the relatively basic format of WAP pages, and their relatively small size, the printed result can seem rather unimpressive.

An advantage of the present invention is that once an address for further information has been received, it can be transmitted to another device capable of viewing the information in that second format. This provides particular advantages when the device receiving the address can not display information in the second format, or can only do so to a limited extent.

The location of data at the remote server is specified in the form of an address. Each address identifies a particular collection of information. The addresses from which data is retrieved from a remote source are preferably in the form of Uniform Resource Locators (URLs). These specify data sources according to a unified standard.

Preferably, the address received from the remote server identifying a source of further information corresponds to a page on the Internet encoded using HTML. This may of course include other forms of encoding, such as Java applications.

The address received from the remote source may be received in isolation, or it may be accompanied by further information for display on the portable device.

A further advantage of embodiments of the present invention is that a received item of information is able to be associated with two different sources of information. Depending on a choice made by the user, he is able to either: select an item from the received information, and elect to be re-directed to an address explicitly encoded with that displayed item; or send a request to the remote source to query a database to ascertain whether there is a further address associated with the selected item, and if there is such an address, to send it to the user's telephone.

The address may be sent to the user as part of the WAP messaging between the network and the telephone, or by some other means such as a short message using Short Message Service (SMS).

An advantage of operating a system according to aspects of the invention is that an information provider can provide differing degrees of information depending on the intended viewing device. Someone using a WAP-equipped portable device can be offered a subset of the full information available via an Internet website. However, the user of the portable device is easily able to discover, from the WAP site, information revealing to him the source of further information viewable from a suitably connected device.

Advantageously, the invention can be applied to other wireless browsing standards as well as WAP. Specifically, embodiments of the invention operable according the Japanese i-mode standard are envisaged.

The WAP standard has been developed to address particular issues with regard to data-browsing in portable devices. Such devices tend to have small monochrome displays, and are unable to download data very quickly, when compared to desktop devices. For this reason, even if capable of viewing HTML pages, portable devices are generally unable to display the information as the author of the information intended.

Aspects of the invention are applicable to other communication standards, especially where physical limitations in a given device act to dictate how communication between the device and a remote source is effected.

BRIEF DESCRIPTION OF THE DRAWINGS

For a better understanding of the present invention, and to understand how the same may be brought into effect, the invention will now be described, by way of example only, with reference to the appended drawings in which.

DETAILED DESCRIPTION OF THE INVENTION

Figure 1:
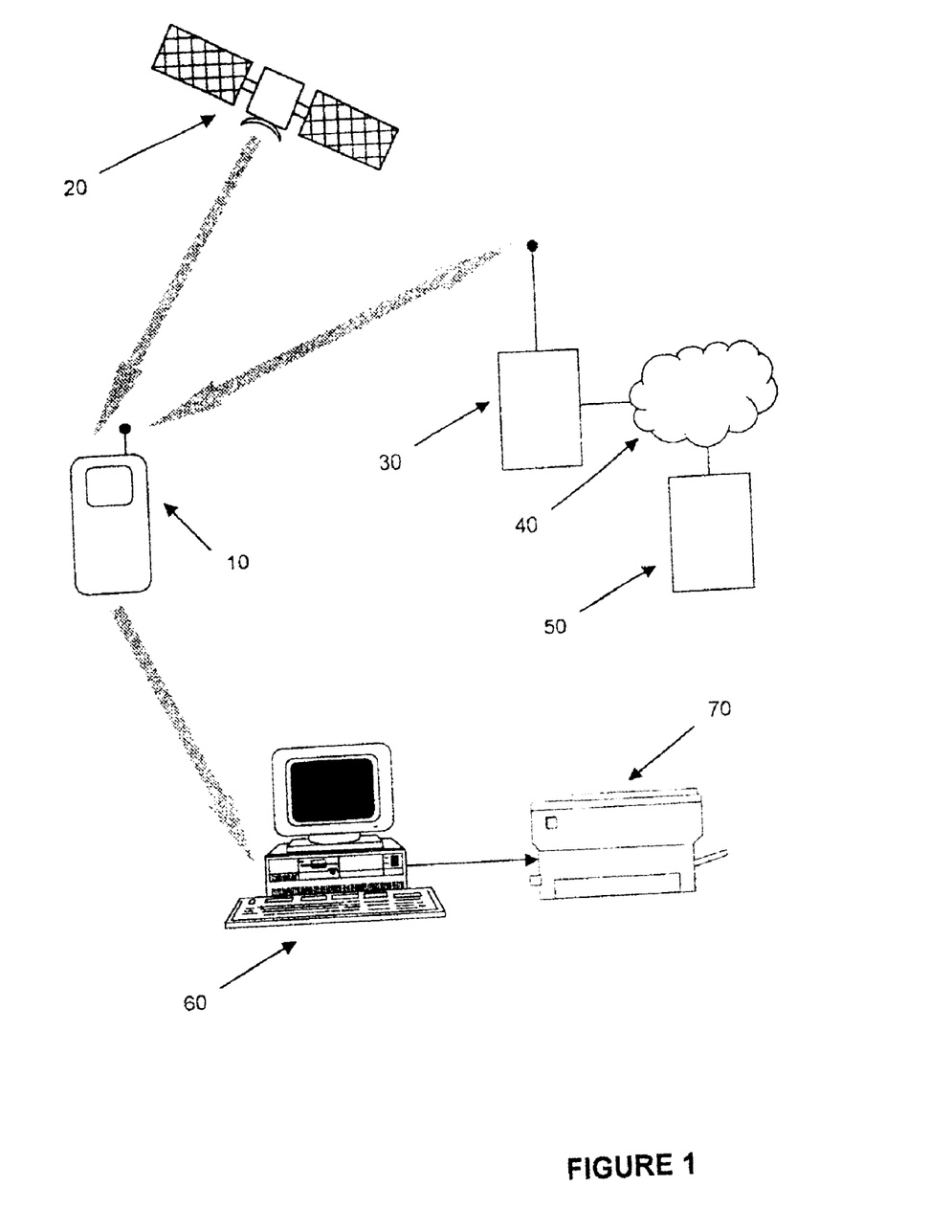
FIG. 1 shows an embodiment of a system operable to perform the invention.

FIG. 1 shows an overview of the typical components involved in a WAP system according to embodiments of the invention. The WAP enabled telephone 10 is the user's means of obtaining data from a remote WAP server 50. The WAP server 50 hosts one or more pages of encoded information suitable for transmission to a WAP enabled telephone. The WAP server 50 is connected via a communication network 40 to a Base Transceiver Station (BTS) 30. The communication network can be a fixed line network, a mobile network, or a mixture of the two.

The BTS 30 is ultimately responsible for transmitting WAP pages to the telephone 10. The BTS forms part of a mobile communication network and may operate according to one or more communication standards such as GSM, CDMA or PDC. The BTS is also responsible for receiving WAP messages from the telephone 10. The BTS is in fact responsible for all voice and text communication between the telephone 10 and the network 40.

The telephone 10 of this system is equipped with circuitry to make use of the Global Positioning System (GPS). This system takes readings from a constellation of satellites to accurately calculate the latitude and longitude of a suitably equipped device. In FIG. 1, a single satellite 20 is shown, but in reality, to calculate position, the device must receive signals from three satellites. This particular facility is not essential for the operation of embodiments of the invention, but provides a useful function if available.

The telephone 10 is further supplied with a transmitter to enable it to communicate with other devices such as Personal Computers 60, or other mobile devices. The transmitter may also comprise a corresponding receiver to facilitate two-way communication.

The computer 60 is connected to a printer 70 to enable hard copies of data to be produced.

Figure 2:
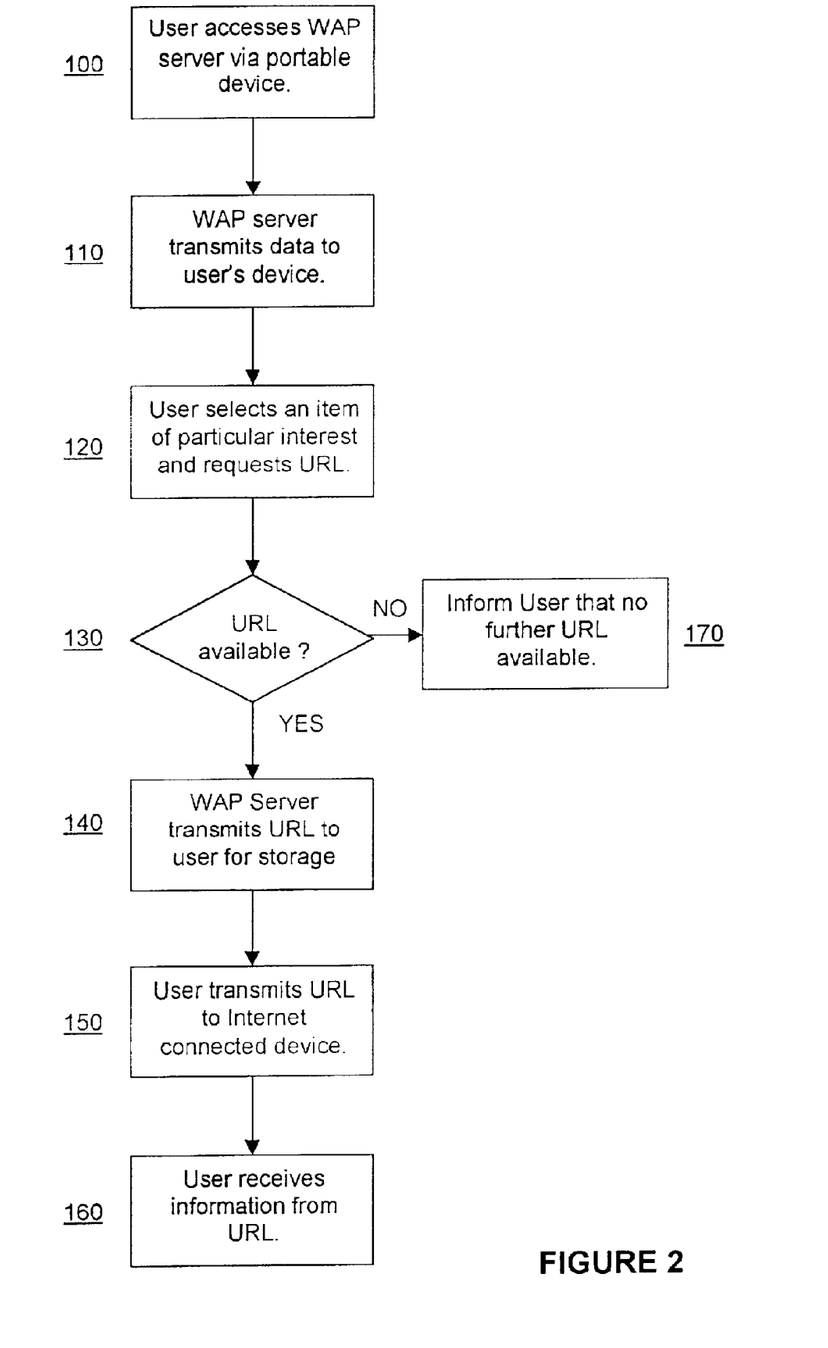
FIG. 2 shows a flowchart describing the basic mode of operation of embodiments of the invention.

FIG. 2 shows a flowchart detailing the basic operation of embodiments of the invention. Starting at 100, the user initiates access to a remote WAP server via the menu functions of his mobile telephone. Once in WAP mode, the user can select a site he wishes to visit so that the remote WAP server can transmit 110 to him the information he has requested.

The data received from the remote WAP server is typically quite limited, and may not offer all the information that the user requires. If the user wishes to learn more about a particular topic or issue on the received page of data, he can select that topic and, from a menu option, requests more information on that topic 120. That further information is in the form of a URL for a page on the WWW or Internet.

The WAP server then checks 130 to see whether the user's selected topic has a URL associated with it which provides further information.

If no URL is registered for the particular topic selected, then the user is informed that no more information is available 170.

If, on the other hand, a further URL is associated with the selected topic, then that URL is transmitted 140 to the user, and stored in the user's telephone. As an alternative, the transmitted URL may be stored in the user's SIM card or some other removable memory module.

The association of a further URL with the selected topic is performed by the provider of the information at the WAP site. The information provider may be in the business of providing information relating to a particular topic, and may provide the further URL as a value-added service for his customers or subscribers.

Alternatively, an individual may have a personal page hosted on a WAP server, and he may wish to use this page to direct users to his regular page on the WWW. In that case, he may set up his WAP page with the addition of the further URL which can point those interested to his WWW page.

Once the user has access to a device, such as a desktop PC, which is better suited to accessing the stored URL received from the WAP server, he can transmit 150 the URL to that device. The transmission may be achieved through use of a wired link, a wireless link such as BlueTooth or an Infra Red link such as IrDA.

The desktop PC can then retrieve the page of data from the URL in the customary manner, using a browser application. The user can then view this information, save it if he wishes, and print it to a suitable printer.

Another option is for the user to transmit the URL to a suitably connected printer, which can access the information at that URL and print it directly for the user without the intermediate step of viewing it on a display. Such a suitably equipped printer may be one that is connected to a Local Area Network (LAN).

Figure 3:
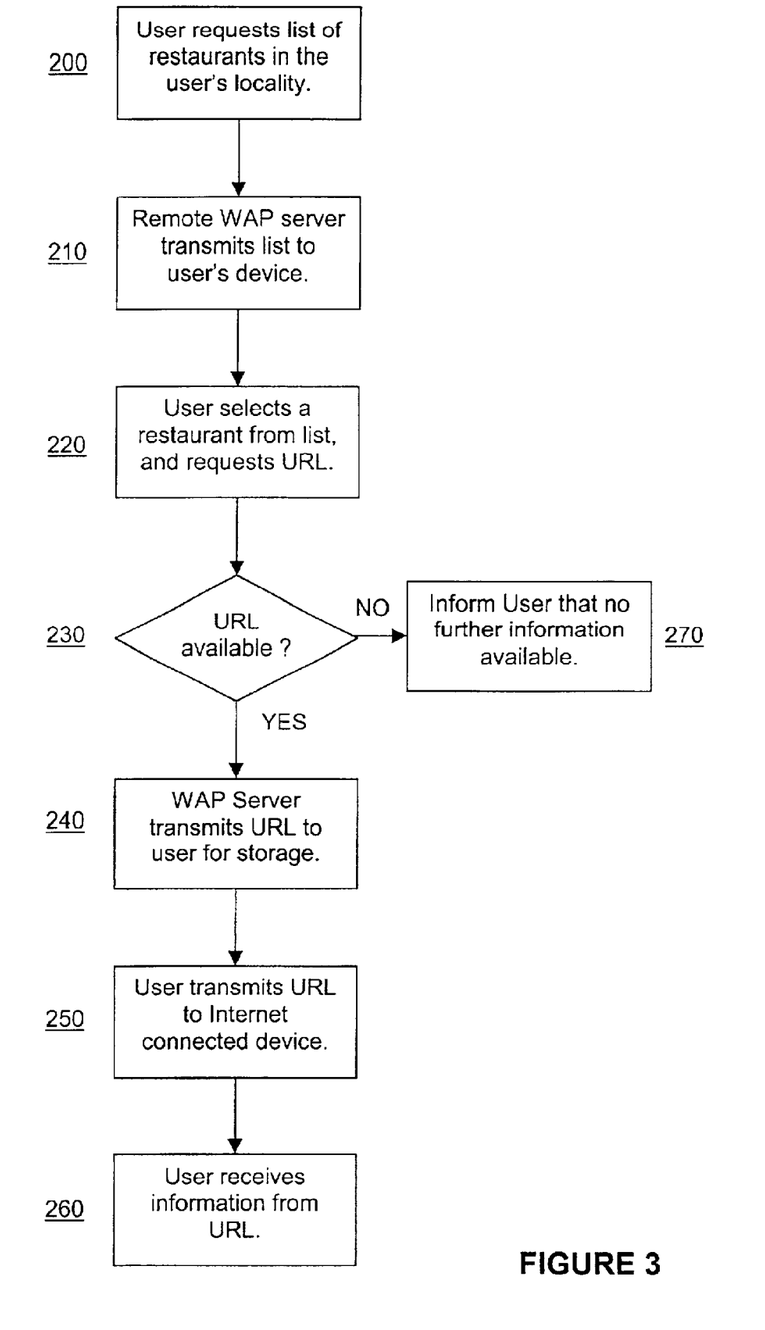
FIG. 3 shows a flowchart similar to FIG. 2, describing a specific use of an embodiment of the invention.

A more specific illustrative example is given in FIG. 3. In this example, the user has a portable WAP-enabled telephone which also has a built-in positioning system. A suitable positioning system is GPS (Global Positioning System). With this system, a user's position can be calculated to the nearest 10 meters.

Suppose the user is travelling away from home, and whilst out walking away from his hotel, he decides to investigate what restaurants are available in the locality 200. Using his GPS-equipped WAP telephone, he can select a WAP site which will send him 210 a list of restaurants within a given radius of his current location, as calculated using GPS. If his telephone is not supplied with the GPS service, alternatives are available: the telephone can determine the approximate position by knowing to which BTS it is currently connected; the user can be prompted to input the name of the town; or the user can be prompted to input a postal/ZIP code.

However, due to the limited information available via WAP, he will probably only receive from the remote server the names, physical addresses and perhaps typical prices of nearby restaurants. Perhaps being something of a connoisseur, this is not enough information for the user, and he decides that he would like some more information on one or two of the restaurants identified in the received list.

To do this, he highlights a particular restaurant in the received list, and using the telephone's menu functions, selects a "More Info" or "Get URL" option 220. This action causes a request to be transmitted to the remote WAP server which supplied the original list.

In addition to the "More Info" or "Get URL" option described above, the user may be presented with other options. One such alternative may be "Go To" or "Select". If the user chooses such an option, he will be directed towards another address, as is known from prior art implementations.

This is in contrast to the previously described option where the user will receive a transmission from the WAP server comprising a URL for a different site, intended to be visited at a later time using a different device. Of course, the transmission from the WAP server may also contain additional information as well as just the URL.

It is to be noted that when the user chooses the 'Select' option, he is requesting a direct download of the information stored at the address which is encoded with the link description viewed on the display. The address to which he will be transferred is thus already in the telephone's memory.

However, when he chooses the 'Get URL' option, a request is sent to the WAP server to query a database to ascertain whether there is a URL associated with the selected item. If there is an associated URL, then the URL is sent to the user. The user is not re-directed to the URL, as the intention is that he will view the information located at the stored URL at a later date with another device.

When the WAP server receives the request, it checks 230 to determine whether any more information in the form of a URL is available for the selected restaurant.

If no further information is available, the WAP server sends an appropriate message to the user. He is then able to try again with a different restaurant if he so chooses.

If, however, more information is available, then the WAP server responds by sending 240 to the user's phone a URL from which further information may be obtained. The URL may be sent alone, or it may be accompanied by further information for display on the device. The URL is then stored in the user's telephone, or as mentioned previously, in a removable memory device such as a SIM card. In this example, if the restaurant has a website on the Internet, its URL may be transmitted to the user.

Once the user has obtained more information on as many restaurants as he wishes, he can return to his hotel, where he can use his laptop computer and a regular telephone line to visit the received URLs, taking advantage of the laptop computer's better display capabilities and the increased data rate achievable using a fixed telephone line.

In order to transfer the URL from his mobile telephone, the user transmits 250 it using one of a number of possible transmission standards as previously described. The transmission is initiated using a menu function which allows the user to pick one of possibly many stored URLs for transmission. Which method of transmission is used is a matter of preference, and of which method(s) the portable telephone and laptop computer support.

The transmission to the laptop computer may be formatted so that the laptop computer is informed of the nature of the message, and so knows to open an Internet browser application such as Netscape Navigator or Microsoft Internet Explorer, to receive the incoming URL.

Using the Internet browser application, the user is able to browse the web pages for his chosen restaurant 260, and if so formatted, may be able to view that evening's menu, read reviews of the restaurant, examine photographs of the restaurant and it's food, and email the proprietor to book a table for dinner. Of course, if he has access to a printer, he can create a hard copy of the web pages for future reference.

FIG. 4 shows how the display of the telephone appears to the user during the process of choosing a restaurant, used to exemplify the invention.

Figure 4A:
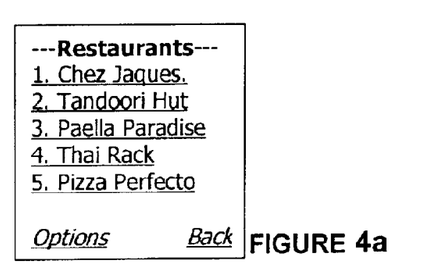
FIG. 4 shows a series of display screens from a portable device.

The display of FIG. 4a shows a list of restaurants located in the vicinity of the user in response to his requesting such a list from a WAP server, as in step 200 of FIG. 3.

Figure 4B:
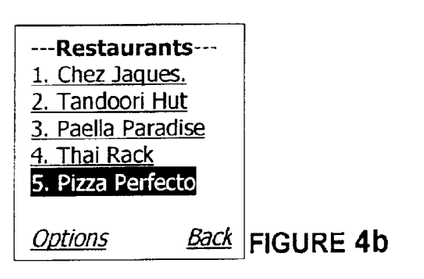

The user decides that option number 5 sounds interesting, and so at FIG. 4b, he highlights that option using the telephone's keypad controls, and operates the key positioned beneath the 'Options' Label. It is noted that the two labels shown at the bottom of each display define the operation of keys situated immediately beneath the labels. Such keys are normally called softkeys.

Figure 4C:
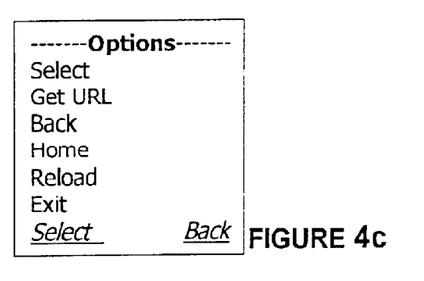

In response to the operation of the 'Options' softkey, a list of possible options is presented to the user as shown in FIG. 4c. By choosing the 'Select' option, he may be taken to a further page of information related to his selected restaurant. The location or address of that further page of information is encoded along with the displayed information on the telephone's display. Such information may include the restaurant's physical address and telephone number. However, due to the limitations of the WAP service, such information will necessarily be limited.

Other options available include: 'Back', which will return the user to the previous screen; 'Home', which will take the user to his previously defined home page; 'Reload', which will refresh the information on the current page by requesting a retransmission from the WAP server; and 'Exit', which will quit the browsing function.

Figure 4D:
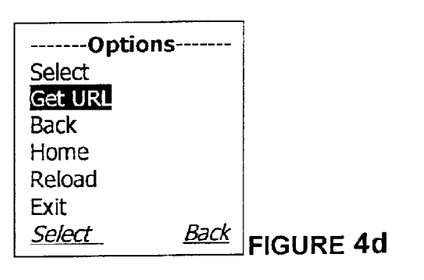

However, the user chooses the 'Get URL' option using the keypad and the appropriate softkey, as shown in FIG. 4d. Choosing this option causes a request to be transmitted to the WAP server to check whether an address for further information is available for the selected item. In this case, a further URL is available, and so the user is informed via a message as shown in FIG. 4e.

Figure 4E:
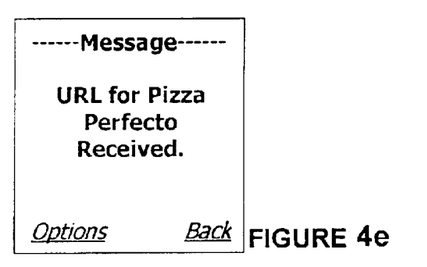
Figure 4F:
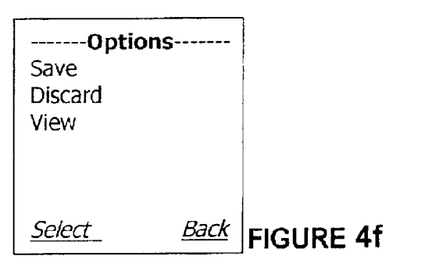

By operating the 'Options' key as shown in FIG. 4e, a menu as shown in FIG. 4f is displayed. This menu offers the user the choices of: 'Save', which will cause the received URL to be stored in the telephone for later use; 'Discard', which will delete the received URL from the telephone's memory; or 'View', which will display the URL on the display.

Figure 4G:
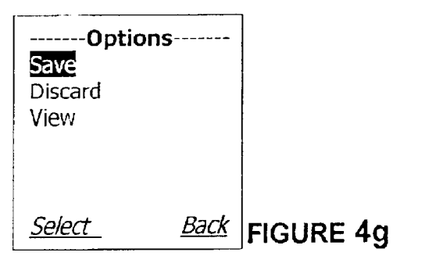

As shown in FIG. 4g, the user chooses to save the URL for future use.

Figure 4H:
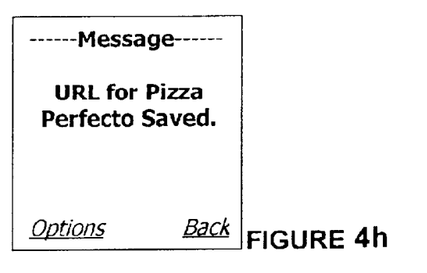

A message is displayed, as shown in FIG. 4h, to confirm that the URL has been stored.

Of course, the embodiment described above is only exemplary, and the same method, techniques and apparatus can be applied to any number of different situations where a limited amount of information arouses the interest of the user.

To understand more fully, it is instructive to understand something of the way in which WAP pages are constructed. WAP Pages comprise decks of cards, as known in the art. WAP pages are formatted using Wireless Markup Language (WML), which is a variant of XML (Extensible Markup Language). This is in contrast to WWW pages, which are formatted using Hyper Text Markup Language (HTML) which is also a markup language, but it doesn't follow the strict rules laid down to qualify as a variant of XML.

HTML pages are not compatible with WML pages and so may not be viewed on a browser configured to view WML pages and vice-versa.

When a user requests a WAP page from his browser, a request is sent via the network to the relevant WAP server. The server responds by transmitting to the user, via the network, data which is interpreted by the browser. The interpretation by the browser is controlled by the markup tags applied to the data. These tags are textual labels applied to the raw data to control the way in which the data is presented on the telephone's display. They can, for instance, define sections of text to appear in a bold typeface or underlined. They are also used to define additional options related to the received page. In this way, a tag can be introduced and associated with a given item on the received page of information, in such a way that once the user selects that item using the cursor keys, he is presented with a list of further options. One such option in this case may be titled "More Information", "Get URL" or similar. By selecting this option, a request is sent to the WAP server as previously described.

Although this invention has been described in terms of its applicability to telephones functioning according to the WAP standard, it is equally applicable to telephones and other devices operating according to other standards, particularly, but not limited to, telephones using the i-mode system used especially in Japan.

The present invention includes any novel feature or combination of features disclosed herein either explicitly or any generalisation thereof irrespective of whether or not it relates to the claimed invention or mitigates any or all of the problems addressed.

What is claimed is:

1. A method of operating a portable wireless communication device operable to access a remote source of information, and capable of viewing information encoded in a first format, comprising, at the portable wireless communication device, the steps of:
   receiving information from the remote source;
   selecting an item of information;
   transmitting to the remote source a request for an address associated with the selected item of information, said address corresponding to a source of further information on the selected item and said further information being encoded in a second format;
   receiving from the remote source the address in response to the request; and
   transmitting the received address to another device capable of viewing information in the second format.

2. A method as claimed in claim 1, wherein the wireless communication device is operable according to the Wireless Application Protocol (WAP) communication standard.

3. A method as claimed in claim 2, wherein the received information is encoded using Wireless Markup Language (WML).

4. A method as claimed in claim 1, wherein the wireless communication device is operable according to the i-mode standard.

5. A method as claimed in claim 1, wherein the selection of an item on the received page of information is achieved using at least one key on a keypad.

6. A method as claimed in claim 1, wherein the address is a Uniform Resource Locator (URL).

7. A method as claimed in claim 1, wherein the address corresponds to a source of information encoded using Hyper Text Markup Language (HTML).

8. A method as claimed in claim 1, wherein the address is accompanied by other data.

9. A method as claimed in claim 1, wherein the step of transmitting the request and the step of transmitting the address each use a different transmitter.

10. A method as claimed in claim 9, wherein the step of transmitting the address is achieved using one of a wired connection, an Infra-Red (IrDA) connection or a low-powered radio connection, such as BlueTooth.

11. A method of operating a portable wireless communication device operable to access a remote source of information and capable of viewing information encoded in a first format, comprising the steps of:
   receiving information, encoded in the first format, from the remote source at a first address;
   selecting an item of received information; and
   requesting information from one of two addresses associated with the selected item, wherein one of the addresses corresponds to a source of further information, on the selected item, encoded in a second format.

12. A method as claimed in claim 11, wherein one of the addresses is encoded in the received information.

13. A method as claimed in claim 11, wherein the portable wireless communication device is incapable of viewing information encoded in the second format.

14. A portable wireless communication device operable to access a remote source of information and capable of viewing information encoded in a first format, comprising:
   a receiver for receiving information, encoded in the first format, from the remote source at a first address;
   means for selecting an item of information; and
   means for requesting information from one of two addresses associated with the selected item, wherein one of the addresses corresponds to a source of further information, on the selected item, encoded in a second format.

15. A portable wireless communication device as claimed in claim 14, wherein the device is operable according to the Wireless Application Protocol (WAP) Communication standard.

16. A portable wireless communication device operable to access a remote source of information, and capable of viewing information encoded in a first format, comprising:
   a receiver for receiving information from the remote source;
   means for selecting an item of information;
   a transmitter for transmitting to the remote source a request for an address associated with the selected item of information, said address corresponding to a source of further information on the selected item and said further information being encoded in a second format;
   a receiver for receiving from the remote source the address in response to the request; and
   a transmitter for transmitting the received address to another device capable of viewing information in the second format.

17. A portable wireless communication device as claimed in claim 16, wherein the device comprises two transmitters.

18. A portable communication device as claimed in claim 17, wherein a transmitter is operable to communicate with a wireless communication network.

19. A portable communication device as claimed in claim 17, wherein a transmitter is operable to communicate with another local device.

20. A portable wireless communication device as claimed in claim 16, wherein the device is operable according to the Wireless Application Protocol (WAP) Communication standard.

21. A method of operating a wireless communication network operable to communicate with a portable wireless communication device which is capable of viewing information encoded in a first format, comprising the steps of:
   storing items of information encoded in the first format;
   associating with each item of stored information a respective address for retrieving additional information;

transmitting to the wireless communication device information comprising an item selected from the stored items of information;

receiving from the wireless communication device a request for further information on a selected item of information; and transmitting to the device, in response to the request for further information, the address for retrieving additional information associated with the selected item, encoded in a second format.

22. A method as claimed in claim 21, wherein the first step of transmitting to the wireless communication device is performed in response to a request.

23. A wireless communication network operable to communicate with a portable wireless communication device which is capable of viewing information encoded in a first format, comprising:

a store for storing items of information encoded in a first format;

means for associating with each item of stored information a respective address for retrieving additional information;

a transmitter for transmitting to the wireless communication device information comprising an item selected from the stored items of information;

a receiver for receiving from the wireless communication device a request for further information on a selected item of information; and a transmitter for transmitting to the device, in response to the request for further information, the address for retrieving additional information associated with the selected item, encoded in a second format.

24. A method of operating a system comprising a wireless communication network and a plurality of portable wireless communication devices which are capable of viewing information encoded in a first format, comprising the steps of:

the network transmitting information, encoded in the first format, to a portable device;

the portable device transmitting to the network a request for an address from which more information, encoded in a second format, related to a selected received item of information, may be obtained;

the network retrieving the address from a data store in response to the request;

the network transmitting the address to the portable device; and the portable device storing the address for future transmission to another device.

25. A method as claimed in claim 24, wherein the network and portable device are operable according to the Wireless Application Protocol (WAP) communication standard.

26. A method as claimed in claim 25, wherein the data store is a WAP server.

27. A method of operating a portable wireless communication device operable to access a remote source of information and capable of viewing information encoded in a first format and incapable of viewing information encoded in a second format, comprising, at the portable wireless communication device, the steps of:

receiving information from the remote source;

selecting an item of information;

transmitting to the remote source a request for an address associated with the selected item of information, said address corresponding to a source of further information on the selected item and said further information being encoded in the second format;

receiving from the remote source the address in response to the request; and transmitting the received address to another device capable of viewing information in the second format.

28. A method as claimed in claim 27, wherein the address is received from the remote source, in response to the request, without the further information encoded in the second format and the address is transmitted to another device, capable of viewing information encoded in the second format, without the further information encoded in the second format.

29. A method of operating a portable wireless communication device operable to access a remote source of information, and capable of viewing information encoded in a first format, comprising, at the portable wireless communication device, the steps of:

receiving information from the remote source;

selecting an item of information;

transmitting to the remote source a request for an address associated with the selected item of information, said address corresponding to a source of further information on the selected item and said further information being encoded in a second format;

receiving from the remote source the address, without the further information encoded in the second format, in response to the request; and transmitting the received address, without the further information encoded in the second format, to another device capable of viewing information in the second format.

* * * * *

UNITED STATES PATENT AND TRADEMARK OFFICE
CERTIFICATE OF CORRECTION

| | |
|---|---|
| PATENT NO. | : 6,954,638 B2 |
| APPLICATION NO. | : 09/985979 |
| DATED | : October 11, 2005 |
| INVENTOR(S) | : Juhani Mättö et al. |

It is certified that error appears in the above-identified patent and that said Letters Patent is hereby corrected as shown below:

On the Title page, Inventors Item (75):
    Please insert: --James Scales, Berkshire (GB)--
        Item (12) change "Mättö" to read -- Mättö et al.--

Signed and Sealed this

Twenty-ninth Day of August, 2006

JON W. DUDAS
*Director of the United States Patent and Trademark Office*